(12) United States Patent
Yano et al.

(10) Patent No.: US 12,332,868 B2
(45) Date of Patent: Jun. 17, 2025

(54) DATABASE, SERVER, INFORMATION PROCESSING METHOD, AND STORAGE MEDIUM

(71) Applicant: TOYOTA JIDOSHA KABUSHIKI KAISHA, Toyota (JP)

(72) Inventors: Masao Yano, Shizuoka-ken (JP); Yasuhiro Toyama, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/614,917

(22) Filed: Mar. 25, 2024

(65) Prior Publication Data

US 2024/0346005 A1    Oct. 17, 2024

(30) Foreign Application Priority Data

Apr. 11, 2023  (JP) ................................ 2023-064444

(51) Int. Cl.
*G06F 16/22*     (2019.01)
*G06F 16/245*    (2019.01)
*G06F 16/26*     (2019.01)

(52) U.S. Cl.
CPC ........ *G06F 16/2264* (2019.01); *G06F 16/245* (2019.01); *G06F 16/26* (2019.01)

(58) Field of Classification Search
CPC ..... G06F 16/2264; G06F 16/245; G06F 16/26
See application file for complete search history.

(56) References Cited

U.S. PATENT DOCUMENTS

2014/0324401 A1    10/2014  Kishimoto et al.
2021/0182734 A1*   6/2021   Yano ...................... G06N 20/00

FOREIGN PATENT DOCUMENTS

JP        2013-108800 A     6/2013

OTHER PUBLICATIONS

WO2018025618A1 (Year: 2018).*

* cited by examiner

*Primary Examiner* — Hau H Hoang
(74) *Attorney, Agent, or Firm* — SoraIP, Inc.

(57) ABSTRACT

A server receives target sample data sent from the user equipment, and searches sample data in a database using the target sample data as a search query to identify the sample data whose similarity measure to the target sample data is equal to or greater than a threshold. The server identifies a three-dimensional structure model associated with the identified sample data, and outputs the identified three-dimensional structure model as a three-dimensional structure model corresponding to the target sample data.

6 Claims, 7 Drawing Sheets

| SAMPLE ID | SCATTERING DATA | THREE-DIMENSIONAL STRUCTURE MODEL | STRUCTURE INFORMATION |
|---|---|---|---|
| 00001 | S1 | TM1 | M1 |
| 00002 | ... | ... | ... |

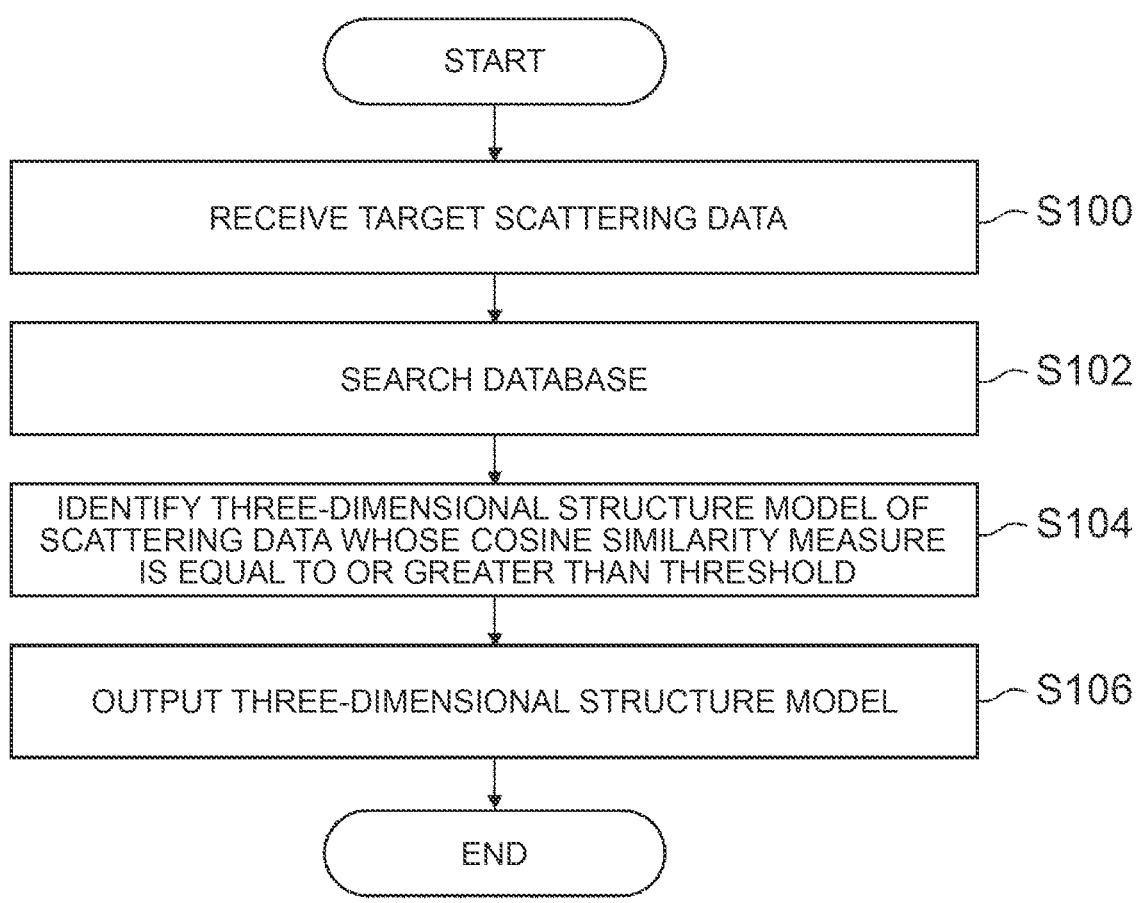

DATABASE, SERVER, INFORMATION PROCESSING METHOD, AND STORAGE MEDIUM

CROSS-REFERENCE TO RELATED APPLICATION

This application claims priority to Japanese Patent Application No. 2023-064444 filed on Apr. 11, 2023, incorporated herein by reference in its entirety.

BACKGROUND

1. Technical Field

The present disclosure relates to a database, a server, an information processing method, and a storage medium.

2. Description of Related Art

Japanese Unexamined Patent Application Publication No. 2013-108800 (JP 2013-108800 A) discloses a method for identifying a three-dimensional structure of a filler in rubber from scattering data by a reverse Monte Carlo method. The method disclosed in JP 2013-108800 A determines a highly statistical three-dimensional structure of a rubber material by the reverse Monte Carlo method from scattering data that is acquired using x-rays and/or neutrons of the rubber material and in which a scattering vector is in a specific range. The method disclosed in JP 2013-108800 A sets a rubber material model based on the three-dimensional structure (e.g., paragraph [0005]).

SUMMARY

The method disclosed in JP 2013-108800 A determines the three-dimensional structure of the rubber material using the reverse Monte Carlo method. The reverse Monte Carlo method is a method in which a final three-dimensional structure is obtained by gradually changing a three-dimensional structure of a target material based on scattering data.

However, the computational complexity of the reverse Monte Carlo method is huge. Therefore, the reverse Monte Carlo method requires a lot of computation time.

The present disclosure was made in view of the above circumstances. It is an object of the present disclosure to provide a database, server, information processing method, and information processing program that can immediately obtain a three-dimensional structure of a particle group constituting a target sample from target sample data.

A database according to a first aspect is a database in an information processing system including a user equipment and a server including the database. The database stores, for each of a plurality of samples, sample data and a three-dimensional structure model in association with each other, the sample data representing diffraction or scattering when electromagnetic waves or particles are incident on the sample, and the three-dimensional structure model including positions of particles constituting the sample. The user equipment sends, to the server, target sample data representing diffraction or scattering when electromagnetic waves or particles are incident on a target sample. The server receives the target sample data, searches the sample data in the database using the target sample data as a search query to identify the sample data whose similarity measure to the target sample data is equal to or greater than a threshold, identifies the three-dimensional structure model associated with the identified sample data, and outputs the identified three-dimensional structure model as a three-dimensional structure model corresponding to the target sample data.

With the database according to the first aspect, a three-dimensional structure of a target sample can be immediately obtained from target sample data. Specifically, when a user wants to immediately obtain a three-dimensional structure of particles constituting a sample to be analyzed, the three-dimensional structure of the sample to be analyzed can be obtained from the database according to the first aspect without performing computations with high computation load.

A server according to a second aspect is a server in an information processing system including a user equipment and the server including the above database. The user equipment sends, to the server, target sample data representing diffraction or scattering when electromagnetic waves or particles are incident on a target sample. The server receives the target sample data, searches the sample data in the database using the target sample data as a search query to identify the sample data whose similarity measure to the target sample data is equal to or greater than a threshold, identifies the three-dimensional structure model associated with the identified sample data, and outputs the identified three-dimensional structure model as a three-dimensional structure model corresponding to the target sample data.

The server according to the second aspect can immediately obtain a three-dimensional structure of a target sample from target sample data. Specifically, by the user searching the database, the server according to the second aspect can obtain a three-dimensional structure of particles constituting a sample to be analyzed. Therefore, the server according to the second aspect can obtain the three-dimensional structure of the sample to be analyzed without performing computations with high computation load. In the second aspect, a plurality of pieces of training data in which sample data and three-dimensional structure models for learning are associated with each other may be prepared, a learned model may be generated based on the pieces of training data, and a three-dimensional structure model may be generated from sample data using the learned model. In this case, a known machine learning model for image generation is used for the trained model. For example, the trained model is generated by a machine learning model learned using a deep learning algorithm.

The sample data according to a third aspect may be small-angle X-ray scattering data.

According to the third aspect, a three-dimensional structure model of a sample can be obtained using small-angle X-ray scattering data.

The similarity measure according to a fourth aspect may be a similarity measure between a change in intensity in the sample data and a change in intensity in the target sample data.

Accordingly, the three-dimensional structure model corresponding to the target sample data can be accurately found from the plurality of three-dimensional structure models stored in the database.

The similarity measure according to a fifth aspect may be a cosine similarity measure between a vector representing a series of intensities in the sample data and a vector representing a series of intensities in the target sample data.

Accordingly, the three-dimensional structure model corresponding to the target sample data can be accurately found from the plurality of three-dimensional structure models stored in the database.

The similarity measure according to a sixth aspect may be a reciprocal of a Euclidean distance between a normalized vector of a series of intensities in the sample data and a normalized vector of a series of intensities of the target sample data.

Accordingly, the three-dimensional structure model corresponding to the target sample data can be accurately found from the plurality of three-dimensional structure models stored in the database.

An information processing method according to a seventh aspect is an information processing method that is performed by a server in an information processing system including a user equipment and the server including the above database.

The information processing method includes causing a computer to perform a process in which the user equipment sends, to the server, target sample data representing diffraction or scattering when electromagnetic waves or particles are incident on a target sample, and the server receives the target sample data, searches the sample data in the database using the target sample data as a search query to identify the sample data whose similarity measure to the target sample data is equal to or greater than a threshold, identifies the three-dimensional structure model associated with the identified sample data, and outputs the identified three-dimensional structure model as a three-dimensional structure model corresponding to the target sample data.

According to the information processing method of the seventh aspect, as in the first or second aspect, a three-dimensional structure of a target sample can be immediately obtained from target sample data.

A non-transitory storage medium according to an eighth aspect stores an information processing program that is executed by a server in an information processing system including a user equipment and the server including the above database. The information processing program causes a computer to perform a process in which the user equipment sends, to the server, target sample data representing diffraction or scattering when electromagnetic waves or particles are incident on a target sample, and the server receives the target sample data, searches the sample data in the database using the target sample data as a search query to identify the sample data whose similarity measure to the target sample data is equal to or greater than a threshold, identifies the three-dimensional structure model associated with the identified sample data, and outputs the identified three-dimensional structure model as a three-dimensional structure model corresponding to the target sample data.

According to the information processing program of the eighth aspect, as in the first or second aspect, a three-dimensional structure of a target sample can be immediately obtained from target sample data.

As described above, the present disclosure is advantageous in that a three-dimensional structure of a particle group constituting a target sample can be immediately obtained from target sample data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart illustrating an example of processing performed by the server according to the embodiment.

DETAILED DESCRIPTION OF EMBODIMENTS

Hereinafter, an information processing system according to an embodiment will be described with reference to the drawings.

Figure 1:
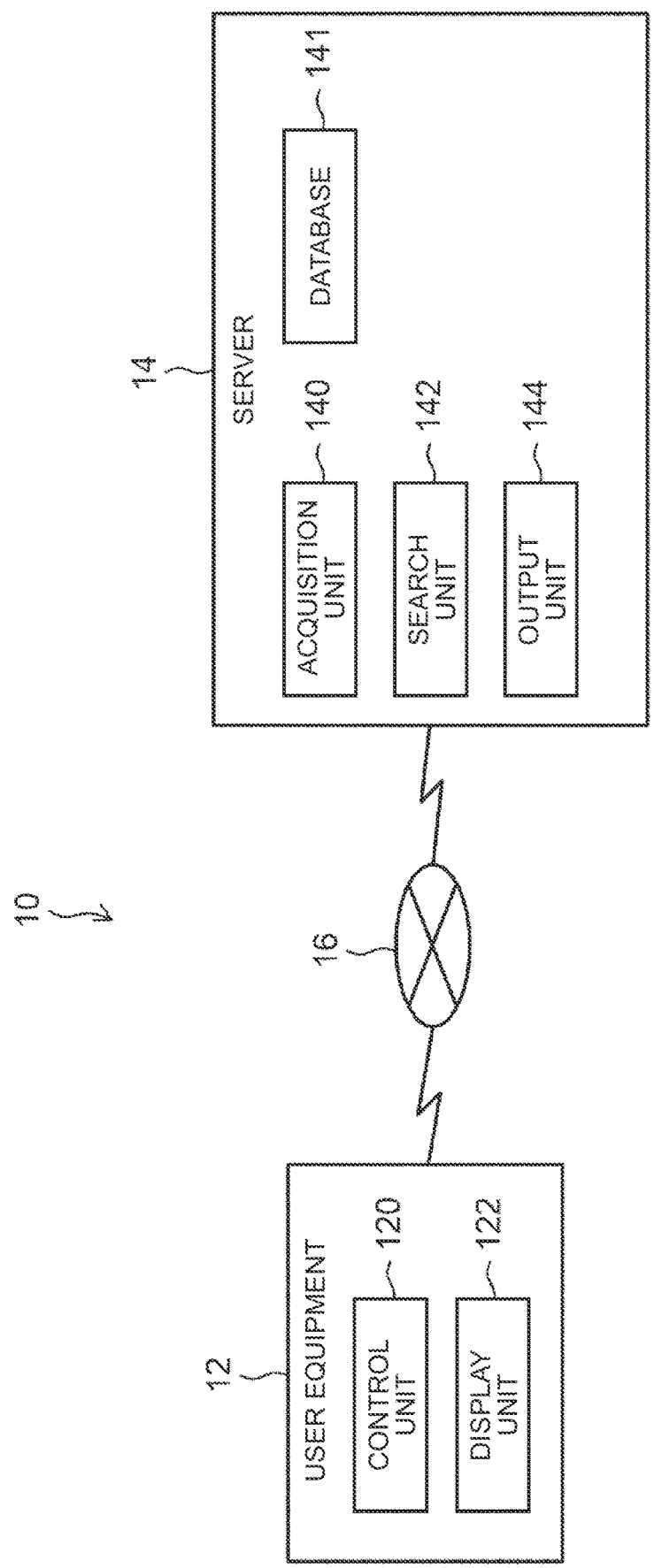
FIG. 1 is a block diagram illustrating an example of a functional configuration of an information processing system according to an embodiment.

FIG. 1 is a block diagram illustrating an example of a functional configuration of an information processing system 10 according to an embodiment. As illustrated in FIG. 1, the information processing system 10 includes a user equipment 12 and a server 14 that is an example of an information processing apparatus. The user equipment 12 and the server 14 are communicably connected via a network 16 such as the Internet, for example.

The database 141 included in the server 14 of the information processing system 10 of the present embodiment is stored in association with the sample data for each of the plurality of samples and the three-dimensional structure model including the three-dimensional position of the particles constituting the sample.

Data representing diffraction or scattering when electromagnetic waves or particles are incident on the sample is sample data. For example, data obtained by a small-angle X-ray scattering (SAXS) method or data obtained by an X-ray diffraction (XRD) method is sample data.

Data representing scattering when an X-ray, which is an example of an electromagnetic wave, is incident on a sample is data obtained by an X-ray small-angle scattering method (hereinafter, also simply referred to as "scattering data"). Further, the data representing the diffraction when the X-ray, which is an example of an electromagnetic wave, is incident on the sample is data obtained by an X-ray diffraction method (hereinafter, also simply referred to as "diffraction data").

When estimating the three-dimensional structure of the particle group constituting the sample from the sample data, for example, a reverse Monte Carlo method as disclosed in JP 2013-108800 A is used.

However, as described above, when the three-dimensional structure of the sample is estimated using the reverse Monte Carlo method, the computational complexity is enormous. The reverse Monte Carlo method requires a lot of computation time. In order to shorten the calculation time, for example, it is necessary to prepare a calculation resource such as a supercomputer, which is not realistic.

On the other hand, for example, when the user wants to know the three-dimensional structure of the particle group constituting the sample to be analyzed, it is often necessary to immediately grasp the approximate three-dimensional structure. Further, it is preferable that the three-dimensional structure of the particle group constituting the sample is visualized and presented to the user instead of numerical data of the position, size, and shape of the particle group.

It is known that the properties of a material are closely related to the structure information inside the material. Here, the structure information is information representing the dispersion of the particle group constituting the sample of the material, the size of the particles, the shape of the particles, and the arrangement of the particles.

As a method of acquiring structure information of a sample, for example, a known Guinier plot and an analytical method based on an extreme rule are known. By using these analysis methods, information on the size and shape of the particles constituting the sample is obtained. On the other hand, even if these analysis methods are used, information on the position of the particles constituting the sample cannot be obtained.

Even if only the information on the size of the particles constituting the sample and the shape of the particles is obtained, if the information on the position of the particles is not obtained, the material developer who is the user has a problem that it is difficult to intuitively understand the relationship between the structural characteristics of the sample and the characteristics of the sample.

Therefore, in the present embodiment, a database 141 in which sample data for each of a plurality of samples is associated with a three-dimensional structure model including the positions of the particles constituting the sample is constructed in advance. Then, from the database 141, sample data similar to the target sample data is identified, and the server 14 of the present embodiment outputs a three-dimensional structure model associated with the identified sample data. This allows the user to immediately obtain an approximate three-dimensional structure of the sample to be analyzed. Also, by visualizing and presenting the three-dimensional structure model, the user can intuitively understand the relationship between the structural characteristics of the sample and the characteristics of the sample.

Figure 2:
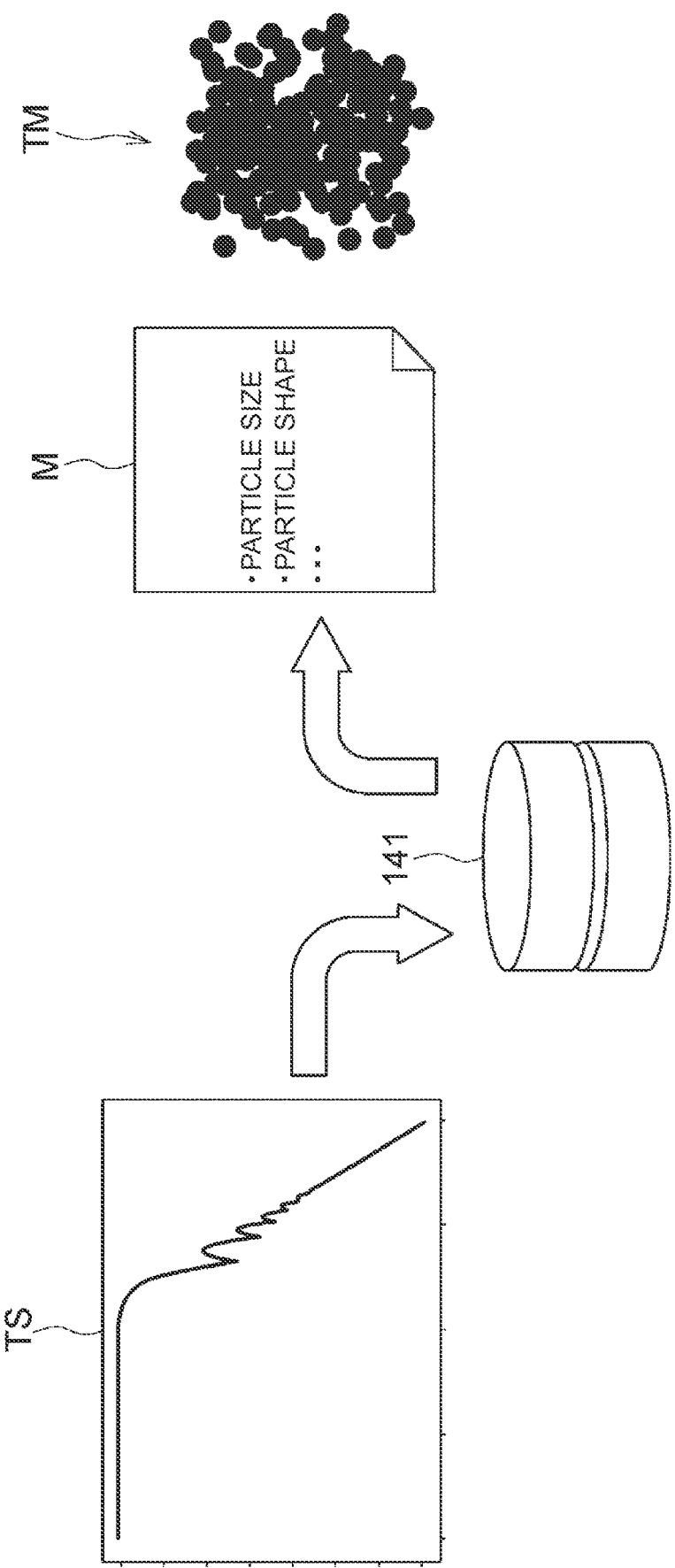
FIG. 2 is a diagram for explaining an outline of an information processing system according to the embodiment.

FIG. 2 is a diagram for explaining an outline of the information processing system 10 according to the present embodiment. As illustrated in FIG. 2, the information processing system 10 of the present embodiment searches the database 141 for sample data similar to the target sample data TS, and outputs the structure information M and the three-dimensional structure model TM associated with the sample data. Note that the structure information M is numerical information representing the size of a plurality of particles constituting the sample, the shape of the plurality of particles, and the like.

Hereinafter, the present embodiment will be described in detail.

User Equipment

The user equipment 12 is operated by a user. Functionally, as illustrated in FIG. 1, the user equipment 12 includes a control unit 120 and a display unit 122.

The control unit 120 controls the operation of the user equipment 12. The display unit 122 displays various types of information under the control of the control unit 120.

For example, the user equipment 12 transmits the target sample data input from the user to the server 14. The scattering data or diffraction data of the target sample to which the user wants to know the three-dimensional structure is the target sample data. In the present embodiment, when the sample data is small-angle X-ray scattering data, it will be described as an example. Therefore, in the following, the target sample data is referred to as target scattering data, and the sample data is referred to as scattering data.

Server

Functionally, as shown in FIG. 1, the server 14 includes an acquisition unit 140, a database 141, a search unit 142, and an output unit 144.

The acquisition unit 140 receives the target scattering data transmitted from the user equipment 12.

The database 141 stores scattering data for each of the plurality of samples and a three-dimensional structure model including the positions of the particles constituting the sample in association with each other.

Figures 3, 4:
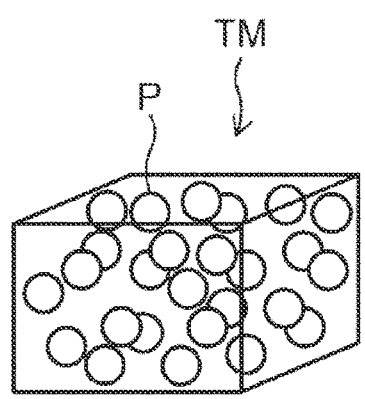
FIG. 3 is a diagram illustrating an example of data stored in a database.
FIG. 4 is a diagram illustrating an example of a three-dimensional structure model.

FIG. 3 is a diagram illustrating an example of data stored in the database 141. As shown in FIG. 3, each of the plurality of samples is stored in the database 141 in association with the scattering data, the structure information representing the structure of the particles constituting the sample, and the three-dimensional structure model. For example, as shown in FIG. 3, the scattering data S1, the three-dimensional structure model TM1, and the structure information M1 are associated with the sample ID "00001."

The three-dimensional structure model is information including three-dimensional positions of a plurality of particles constituting a sample. FIG. 4 illustrates an example of a three-dimensional structure model. As shown in FIG. 4, the three-dimensional structure model TM is three-dimensional information representing the three-dimensional position, size, and shape of each of the plurality of particles P constituting the sample.

In the present embodiment, a data set stored in the database 141 is constructed in advance. For example, a three-dimensional structure model of an interior of a sample is generated from structure information of the sample using known techniques or various techniques. Then, a three-dimensional Fourier transform is performed on the three-dimensional structure model of the sample by using a known method or various methods, whereby one-dimensional or two-dimensional scattering data is calculated in advance.

Figure 5:
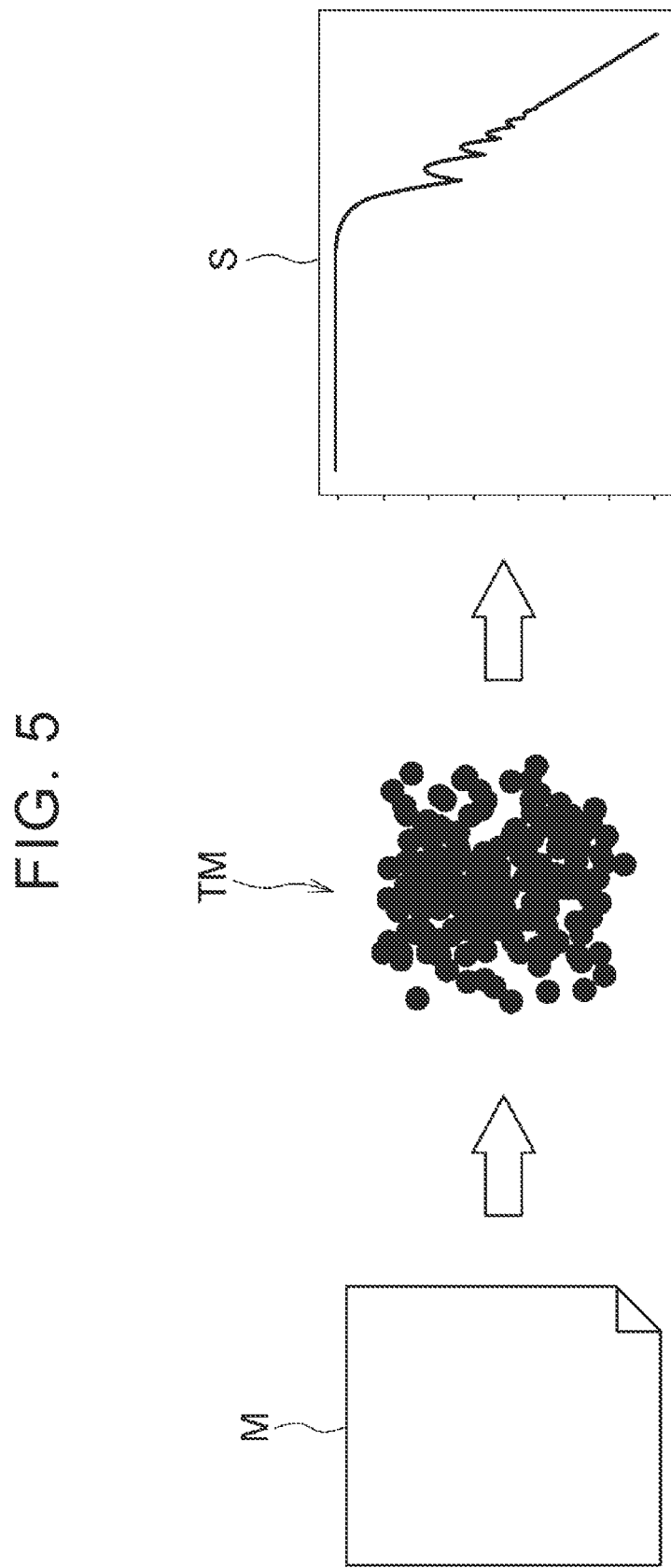
FIG. 5 is a diagram for explaining a flow of a process of generating scattering data from structure information of a sample.

FIG. 5 is a diagram for explaining a flow of processing for generating scattering data from structure information of a sample. As shown in FIG. 5, a three-dimensional structure model TM inside the sample is generated from the structure information M of the sample, and a three-dimensional Fourier transform is performed on the three-dimensional structure model TM to obtain scattering data S.

Therefore, the scattering data stored in the database 141 is pseudo-scattering data. The one-dimensional scattering data can be calculated from the two-dimensional scattering data.

Figure 6:
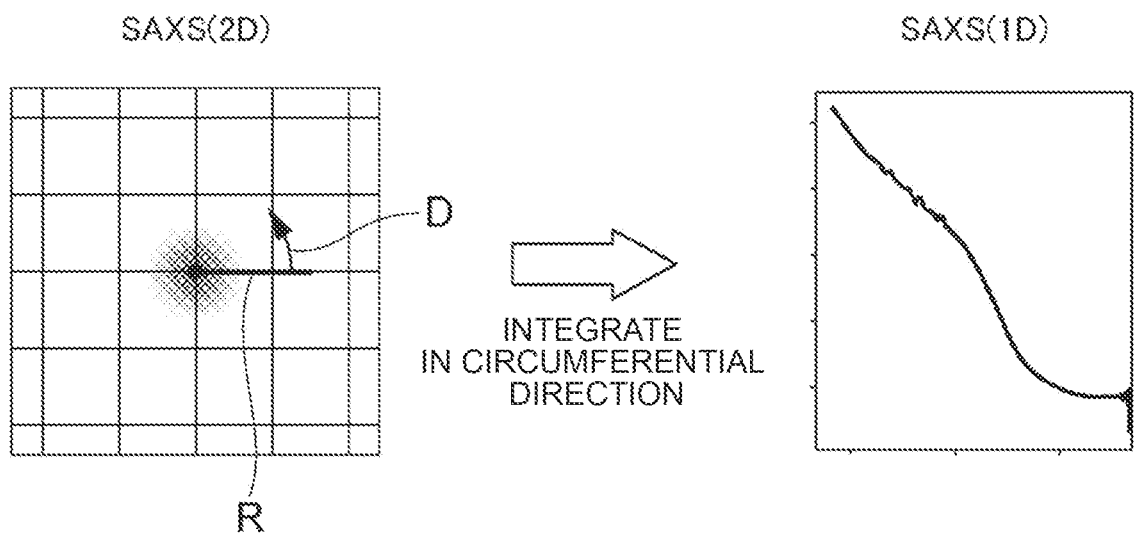
FIG. 6 is a diagram for explaining generation of one-dimensional scattering data from two-dimensional scattering data.

FIG. 6 is a diagram for explaining generation of one-dimensional scattering data from two-dimensional scattering data. As shown in FIG. 6, by performing a known three-dimensional Fourier transform on the three-dimensional structure model of the sample, two-dimensional scattering data (denoted "SAXS (2D)" in FIG. 6) is obtained. In the two-dimensional scattering data, the intensity is represented in the direction of the plane of the paper. A certain predetermined range R is set for the two-dimensional scattering data, and the intensity in the R is integrated in the circumferential direction D, so that one-dimensional scattering data (denoted as "SAXS (1D)" in FIG. 6) is obtained. The horizontal axis of the one-dimensional scattering data represents a scattering angle or a wavenumber, and the vertical axis represents a scattering intensity (hereinafter, simply referred to as "intensity"). Alternatively, the scattering data of the actual sample, the structure information thereof, and the three-dimensional structure model may be actually collected in advance.

The structure information, the three-dimensional structure model, and the scattering data for each of the plurality of samples acquired in advance in this manner are stored in the database 141. As for the scattering data, a vector of the scattering data may be stored in the database 141 instead of the scattering data itself. The vector of the scattering data will be described later.

When the target scattering data received by the acquisition unit 140 is used as a search query and the scattering data in the database 141 is searched, the search unit 142 identifies the scattering data whose similarity measure to the target scattering data is equal to or greater than the threshold. The threshold is set in advance.

As the similarity measure between the scattering data in the database 141 and the target scattering data, for example, the similarity measure between a change in the intensity of the scattering data in the database 141 with respect to the wavenumber and a change in the intensity of the target scattering data with respect to the wavenumber is used. This is because the three-dimensional structure of the particle group constituting the sample is represented by the change in intensity with respect to the wavenumber in the scattering data.

Figure 7:
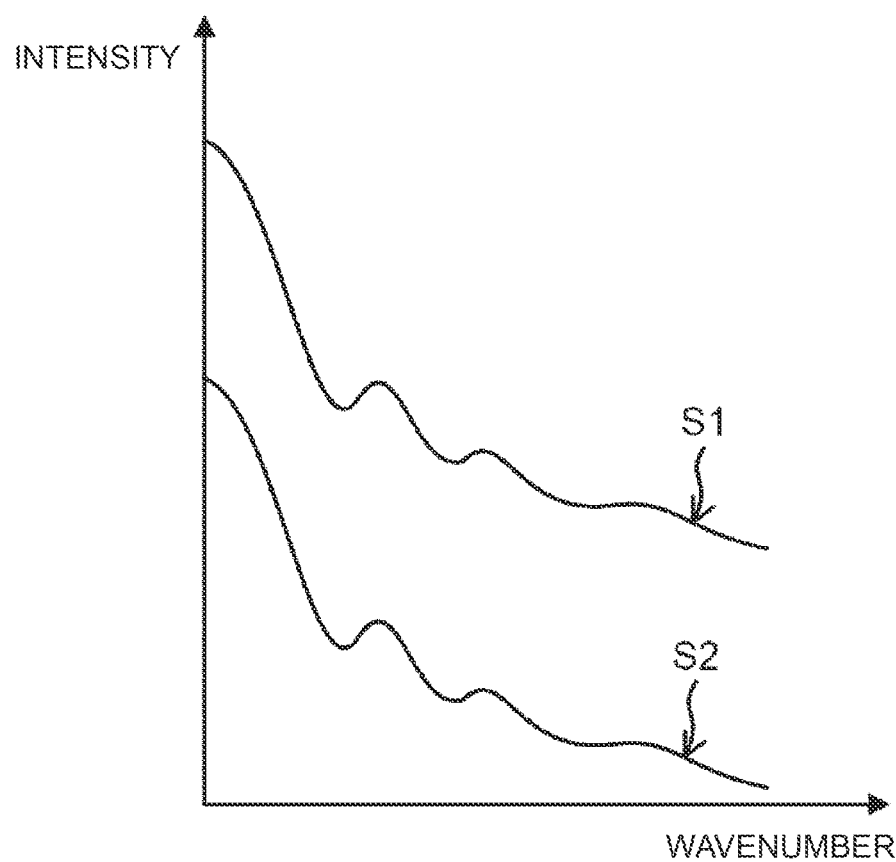
FIG. 7 is a diagram illustrating a similarity measure of scattering data.

FIG. 7 is a diagram illustrating a similarity measure of the scattering data. As shown in FIG. 7, it is conceivable if the scattering data S1 of sample A and the scattering data S2 of sample B are compared. As shown in FIG. 7, the difference between the absolute value of the intensity of the scattering data S1 and the absolute value of the intensity of the scattering data S2 is large. On the other hand, the change in the intensity of the scattering data S1 and the change in the intensity of the scattering data S2 are similar. In such a case, the three-dimensional structure of the particle group constituting the sample A and the three-dimensional structure of the particle group constituting the sample B tend to be similar. Scattering data is data representing scattering when X-rays are incident on the sample. Therefore, the three-dimensional position, the size, and the shape of each of the plurality of particles constituting the sample are represented in the change in the intensity of the scattering data.

Therefore, the search unit 142 of the present embodiment searches for the scattering data in the database 141 using a cosine similarity measure between a vector representing a series of intensities for individual wavenumbers of the target scattering data and a vector representing a series of intensities for individual wavenumbers of the scattering data in the database 141.

Figure 8:
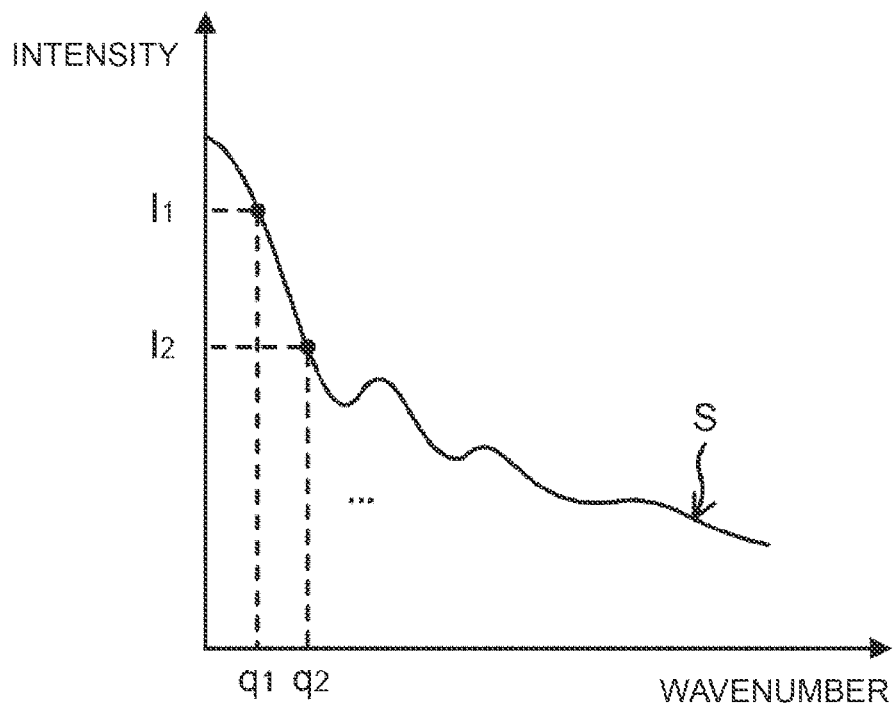
FIG. 8 is a diagram for explaining vectorization of scattering data.

FIG. 8 is a diagram for explaining vectorization of scattering data. As shown in FIG. 8, for example, a vector [$I_1$, $I_2$, . . . ] having an intensity $I_1$ for a wavenumber $q_1$, an intensity $I_2$ for a wavenumber $q_2$, . . . as components is set as a vector of scattering data. Therefore, the search unit 142 calculates the cosine similarity measure between the vector of the target scattering data and each of the vectors of the scattering data in the database 141.

The cosine similarity measure is a similarity measure obtained by dividing the inner product of the vector by the absolute value of the vector. The cosine similarity measure is used when the scattering data in the database 141 is retrieved. Thus, the absolute value of the intensity of the scattering data is not taken into consideration, and the scattering data can be searched in consideration of the change in the intensity with respect to the wavenumber. As a result, scattering data similar to the target scattering data is retrieved, and the three-dimensional structure model associated with the scattering data becomes similar to the three-dimensional structure of the target scattering data. In this way, when the scattering data is used as the sample data, the three-dimensional structure of the sample appears in the change in the intensity of the scattering data. Therefore, it is preferable to use the cosine similarity measure.

The search unit 142 calculates the cosine similarity measure using the vector as described above. Specifically, the search unit 142 calculates the cosine similarity measure between the vector of the target scattering data and the vector of each of the plurality of scattering data stored in the database 141.

Then, the search unit 142 identifies the scattering data in the database 141 whose cosine similarity measure is equal to or greater than the threshold. Further, the three-dimensional structure model associated with the identified scattering data is identified, and the search unit 142 outputs the identified three-dimensional structure model as a three-dimensional structure model corresponding to the target scattering data that is a search query. When a plurality of pieces of scattering data having a cosine similarity measure equal to or greater than the threshold is identified, the search unit 142 outputs each of the three-dimensional structure models for each of the plurality of pieces of scattering data. Alternatively, the search unit 142 outputs the three-dimensional structure model associated with the scattering data having the maximum cosine similarity measure out of the plurality of scattering data having the cosine similarity measure equal to or greater than the threshold. The cosine similarity measure becomes a larger value as the two vectors become similar.

As described above, the server 14 of the present embodiment uses the cosine similarity measure when identifying the scattering data similar to the target scattering data from the plurality of scattering data stored in the database 141. As a result, scattering data corresponding to a three-dimensional structure similar to the three-dimensional structure of the target scattering data is retrieved, and a three-dimensional structure model corresponding to the target scattering data can be obtained.

The output unit 144 outputs the search result obtained by the search unit 142. For example, the output unit 144 outputs a combination of the structure information and the three-dimensional structure model as a search result. The data output from the output unit 144 is transmitted to the user equipment 12.

The user operates the user equipment 12 to confirm information displayed on the display unit 122 of the user equipment 12. For example, the user refers to a three-dimensional structure model as shown in FIG. 4. The user confirms what kind of structure the three-dimensional structure corresponding to the object scattering data designated by the user is.

Figure 9:
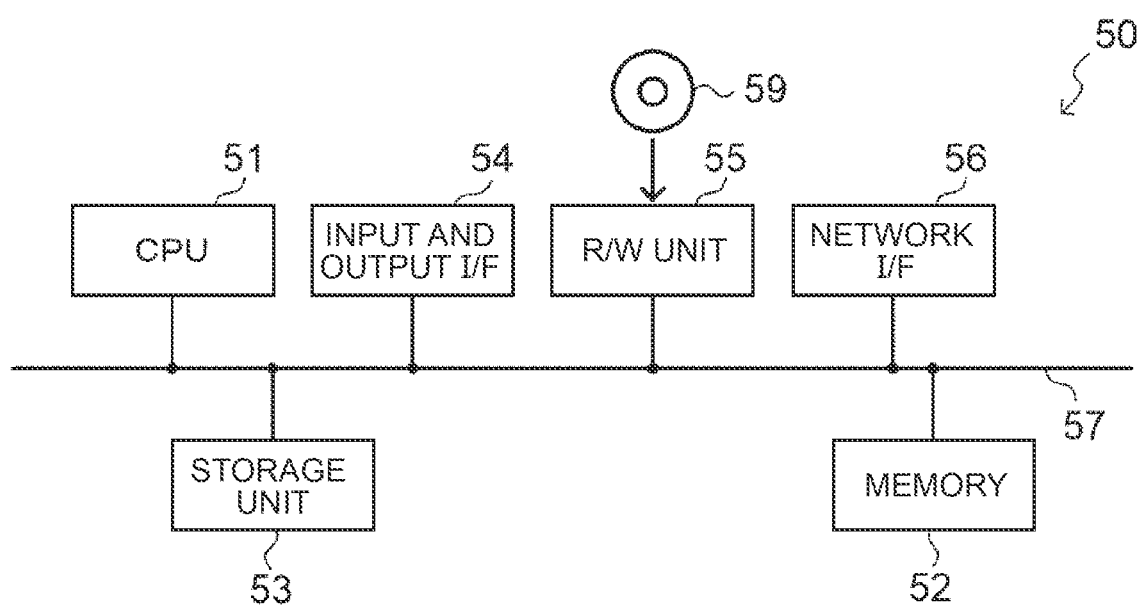
FIG. 9 is a diagram illustrating an exemplary configuration of a computer of a server and a user equipment according to the embodiment.

The user equipment 12 and the server 14 can be realized by the computer 50 as illustrated in FIG. 9, for example. The computer 50 that implements the user equipment 12 and the server 14 includes a CPU 51, a memory 52 as a temporary storage area, and a non-volatile storage unit 53. Further, the computer 50 includes an input/output interface (I/F) 54 to which an input/output device or the like (not shown) is connected, and a read/write (R/W) 55 that controls reading and writing of data to and from the recording medium 59. Further, the computer includes a network I/F 56 connected to a network such as the Internet. CPU 51, the memory 52, the storage unit 53, the input/output I/F 54, R/W unit 55, and the networked I/F 56 are connected to each other via a buss 57.

The storage unit 53 can be realized by Hard Disk Drive (HDD), Solid state drive (SSD), a flash memory, or the like. A program for causing a computer to function is stored in the storage unit 53 as a storage medium. CPU 51 reads the program from the storage unit 53, expands the program into the memory 52, and sequentially executes the processes included in the program.

Next, the operation of the information processing system 10 according to the embodiment will be described.

For example, the user inputs target scattering data, which is scattering data obtained from the target sample, to the user equipment 12 operated by the user.

The control unit 120 of the user equipment 12 receives the target scattering data in response to an operation by the user. Then, the control unit 120 transmits the target scattering data to the server 14 in response to an operation by the user.

When the target scattering data is transmitted from the user equipment 12 to the server 14, the server 14 executes the information processing routine illustrated in FIG. 10.

In S100, the acquisition unit 140 of the server 14 receives the target scattering data transmitted from the user equipment 12.

In S102, the search unit 142 of the server 14 vectorizes the target scattering data. Then, in S102, the search unit 142 of the server 14 searches the scattering data in the database 141 using the vector of the target scattering data as a search query.

In S104, the search unit 142 of the server 14 specifies a vector of scattering data in the database 141 in which the cosine similarity measure between the target scattering data vector and the target scattering data vector is equal to or greater than a threshold. Then, in S104, the search unit 142 of the server 14 identifies the three-dimensional structure model associated with the identified scattering data.

In S106, the output unit 144 of the server 14 outputs the three-dimensional structure model identified by S104 as a three-dimensional structure model corresponding to the target scattering data. Further, the output unit 144 of the server 14 may output the structure information corresponding to the target scattering data.

The data output from the output unit 144 is transmitted to the user equipment 12.

The user operates the user equipment 12 to confirm information displayed on the display unit 122 of the user equipment 12. For example, the user refers to a three-dimensional structure model as shown in FIG. 4, and confirms what kind of structure the three-dimensional structure corresponding to the target scattering data designated by the user is.

As described above, by receiving the target scattering data and searching for the scattering data in the database using the target scattering data as a search query, the server of the information processing system according to the embodiment identifies the scattering data in which the cosine similarity measure between the target scattering data and the target scattering data is equal to or greater than the threshold. Then, the server identifies the three-dimensional structure model associated with the identified scattering data, and outputs the identified three-dimensional structure model as the three-dimensional structure model corresponding to the target scattering data. As a result, the three-dimensional structure of the particle group constituting the sample can be immediately obtained from the target sample data. Specifically, in the present embodiment, a database in which a vector of scattering data or scattering data for each of a plurality of samples and a three-dimensional structure model including three-dimensional positions of particles constituting the sample are stored in association with each other is constructed in advance. By constructing such a database in advance, the user can immediately obtain the three-dimensional structure of the target sample without performing calculations such as the reverse Monte Carlo method.

In addition, it is sufficient that a combination of the scattering data, the structure information, and the three-dimensional structure model for each of the plurality of samples is stored in the database included in the server of the present embodiment. Therefore, the database may have a relatively small storage capacity. Therefore, even in a database having a small storage capacity, various data for immediately obtaining the three-dimensional structure of the sample can be stored.

In addition, the server of the present embodiment uses the cosine similarity measure when identifying the scattering data similar to the target scattering data from the plurality of scattering data stored in the database. As a result, the scattering data corresponding to the three-dimensional structure similar to the three-dimensional structure of the target scattering data is retrieved, and a three-dimensional structure model similar to the three-dimensional structure of the target scattering data can be obtained.

Further, the processing performed by the computer 50 in each of the above-described embodiments has been described as software processing performed by executing a program. However, the present disclosure is not limited thereto. For example, the processing performed by the computer 50 in the above-described embodiments may be processing performed by hardware such as Graphics Processing Unit (GPU), Application Specific Integrated Circuit (ASIC), and Field-Programmable Gate Array (FPGA). Alternatively, the processing performed by the computer 50 in each of the above-described embodiments may be a combination of both software and hardware. Further, in the case of processing by software, the program may be stored in various storage media and distributed.

Further, the present disclosure is not limited to the above, and it is needless to say that various modifications can be made without departing from the scope of the present disclosure.

For example, the sample data of the above-described embodiment has been described as an example in which the sample data is scattering data obtained by the X-ray small-angle scattering method. However, the present disclosure is not limited thereto. The sample data may be any data as long as the data represents diffraction or scattering when electromagnetic waves or particles are incident on the sample. For example, the sample data may utilize diffraction data obtained by X-ray diffractometry.

The diffraction data obtained by the X-ray diffraction method, the waveform pattern of the diffraction data (e.g., the position of the peak) and the pattern of the arrangement of the particles constituting the sample (e.g., crystal structure) is often known in advance.

On the other hand, the scattering data obtained by the small-angle X-ray scattering method is different from the X-ray diffraction method. In many cases, the correspondence relationship between the waveform pattern of the scattering data and the pattern of the arrangement of the particles constituting the sample is not known. Therefore, as described above, when a certain scattering data is obtained, a database for obtaining information such as what the three-dimensional structure of the sample from which the scattering data is obtained is what is constructed is constructed in advance, so that the user can immediately obtain the three-dimensional structure of the particles constituting the sample from the scattering data obtained by the small-angle X-ray scattering method.

Further, for example, diffraction data or scattering data of visible light obtained by incident visible light on the sample may be used as the sample data. Further, for example, neutron diffraction data obtained by entering neutrons into the sample may be used as the sample data.

Further, in the above embodiment, the case where the cosine similarity measure is used when the sample data in the database 141 is searched has been described as an example. However, the embodiment is not limited thereto. For example, the similarity measure may use a reciprocal of a Euclidean distance between a normalized vector of the series of intensities in the sample data and a normalized vector of intensities in the target sample data. When the reciprocal of the Euclidean distance is used as the similarity measure, the smaller the value representing the Euclidean distance, the more similar the two vectors are. Further, when calculating the similarity measure, the logarithm of the intensity may be taken.

For example, when the scattering data is used as the sample data, as described above, the absolute value of the intensity of the scattering data does not necessarily represent the three-dimensional structure of the particle group constituting the sample. Rather than the absolute value of the intensity of the scattering data, the change in the intensity of the scattering data tends to represent the three-dimensional structure of the particle group constituting the sample. In this regard, for example, when the reciprocal of the Euclidean distance between the vectors is used as a similarity measure, the absolute values of the intensities of the scattering data are considered. It is therefore preferable to normalize the vectors of the scattering data. For this reason, for example, the reciprocal of the Euclidean distance may be calculated using vectors normalized so that the maximum value of the intensity of the vector of the scattering data is 1 (that is, based on the normalization by the highest intensity). Alternatively, for example, the reciprocal of the Euclidean distance may be calculated using vectors normalized so that the sum of components of the vector of the scattering data is 1 (i.e., based on normalization of the intensity by area) using the vector. As a result, as in the case of using the cosine similarity measure, the scattering data corresponding to the three-dimensional structure similar to the three-dimensional structure of the target scattering data is retrieved, and a three-dimensional structure model similar to the three-dimensional structure of the target scattering data can be obtained.

In addition, a learned model, which is a machine learning model learned in advance, is stored in a storage unit (not shown) included in the server 14. When the target sample data is input to the learned model, a three-dimensional structure model corresponding to the target sample data may be output. In this case, for example, a plurality of pieces of training data in which sample data and three-dimensional structure models for learning are associated with each other may be prepared, a learned model may be generated based on the pieces of training data, and a three-dimensional structure model may be generated from sample data using the learned model. In this case, a known machine learning model is used as the learned model. The learned model is generated by, for example, causing a machine learning model to be learned using a deep learning algorithm.

In addition, a learned model, which is a machine learning model learned in advance, is stored in a storage unit (not shown) included in the server 14. When target sample data is input to the learned model, structure information (for example, numerical data representing the position, size, and shape of particles) corresponding to the target sample data may be output.

What is claimed is:

1. An information processing system comprising:
    a user equipment; and
    a server including a processor and memory that stores a database,
        the database holding a plurality of pieces of sample data for a plurality of samples respectively,
        the database further holding a plurality of three-dimensional structure models respectively corresponding to the plurality of pieces of sample data, respectively,
        each of the plurality of pieces of sample data representing diffraction or scattering when electromagnetic waves or particles are incident on a corresponding one of the plurality of samples, and
        each of the plurality of three-dimensional structure models including positions of particles constituting a corresponding one of the plurality of samples, wherein
    the user equipment is configured to send target sample data to the server, the target sample data representing diffraction or scattering when electromagnetic waves or particles are incident on a target sample, and
    the processor is configured to receive the target sample data from the user equipment, search the database using the target sample data as a search query to identify a selected piece of sample data from among the plurality of pieces of sample data in the database,
        the selected piece of sample data exhibiting a similarity measure of a change in intensity in the selected piece of sample data to a change in intensity in the target sample data, and
        the similarity measure being equal to or greater than a threshold,
    identify a three-dimensional structure model corresponding to the identified selected piece of sample data from the plurality of three-dimensional structure models in the database, and
    output the identified three-dimensional structure model as a three-dimensional structure model corresponding to the target sample data.

2. A server in an information processing system including user equipment, the server comprising:
    memory storing a database,
        the database holding a plurality of pieces of sample data for a plurality of samples, respectively,
        the database further holding a plurality of three-dimensional structure models respectively corresponding to the plurality of pieces of sample data, respectively,
        each of the plurality of pieces of sample data representing diffraction or scattering when electromagnetic waves or particles are incident on a corresponding one of the plurality of samples, and
        each of the plurality of three-dimensional structure models including positions of particles constituting a corresponding one of the plurality of samples; and
    a processor configured to
        receive target sample data from the user equipment, the target sample data representing diffraction or scattering when electromagnetic waves or particles are incident on a target sample, search the database using the target sample data as a search query to identify a selected piece of sample data from among the plurality of pieces of sample data in the database,
    the selected piece of sample data exhibiting a similarity measure of a change in intensity in the selected piece of sample data to a change in intensity in the target sample data, and
    the similarity measure being equal to or greater than a threshold,
    identify a three-dimensional structure model corresponding to the identified selected piece of sample data from the plurality of three-dimensional structure models in the database, and
    output the identified three-dimensional structure model as a three-dimensional structure model corresponding to the target sample data.

3. The server according to claim 2, wherein each of the plurality of pieces of sample data is small-angle X-ray scattering data.

4. The server according to claim 2, wherein the similarity measure is represented by a cosine similarity measure of a vector representing a series of intensities in the selected piece of sample data to a vector representing a series of intensities in the target sample data.

5. The server according to claim 2, wherein the similarity measure is represented by a reciprocal of a Euclidean distance of a normalized vector of a series of intensities in selected piece of sample data to a normalized vector of a series of intensities of the target sample data.

6. A non-transitory storage medium storing an information processing program that causes an information processing system to perform functions and is executed by the information processing system, the information processing system including user equipment and a server, the functions comprising:

sending, by the user equipment target sample data to the server, the server storing a database,
    the target sample data representing diffraction or scattering when electromagnetic waves or particles are incident on a target sample,
    the database holding a plurality of pieces of sample data for a plurality of samples, respectively,
    the database further holding a plurality of three-dimensional structure models respectively corresponding to the plurality of pieces of sample data, respectively,
    each of the plurality of pieces of sample data representing diffraction or scattering when electromagnetic waves or particles are incident on a corresponding one of the plurality of samples, and
    each of the plurality of three-dimensional structure models including positions of particles constituting a corresponding one of the plurality of samples;

receiving, by the server, the target sample data from the user equipment;

searching, by the server, the database using the target sample data as a search query to identify a selected piece of sample data from among the plurality of pieces of sample data in the database,
    the selected piece of sample data exhibiting a similarity measure of a change in intensity in the selected piece of sample data to a change in intensity in the target sample data, and
    the similarity measure being equal to or greater than threshold;

identifying, by the server, a three-dimensional structure model corresponding to the identified selected piece of sample data from the plurality of three-dimensional structure models in the database; and outputting, by the server, the identified three-dimensional structure model as a three-dimensional structure model corresponding to the target sample data.

\* \* \* \* \*